US010849463B2

(12) United States Patent
De' Longhi et al.

(10) Patent No.: US 10,849,463 B2
(45) Date of Patent: Dec. 1, 2020

(54) COOKING APPARATUS

(71) Applicant: DE' LONGHI APPLIANCES S.R.L. CON UNICO SOCIO, Treviso (IT)

(72) Inventors: Giuseppe De' Longhi, Treviso (IT); Gianpaolo Trevisan, San Martino Buon Albergo (IT); Renzo Mazzon, Silea (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 250 days.

(21) Appl. No.: 15/777,335

(22) PCT Filed: Nov. 18, 2016

(86) PCT No.: PCT/IB2016/056958
§ 371 (c)(1),
(2) Date: May 18, 2018

(87) PCT Pub. No.: WO2017/085679
PCT Pub. Date: May 26, 2017

(65) Prior Publication Data
US 2018/0325322 A1 Nov. 15, 2018

(30) Foreign Application Priority Data

Nov. 19, 2015 (IT) .................... 102015000074523

(51) Int. Cl.
*A47J 27/00* (2006.01)
*A47J 45/06* (2006.01)
(Continued)

(52) U.S. Cl.
CPC .......... *A47J 45/061* (2013.01); *A47J 27/004* (2013.01); *A47J 36/32* (2013.01); *A47J 37/0641* (2013.01); *A47J 37/1209* (2013.01); *A47J 43/046* (2013.01)

(58) Field of Classification Search
CPC .. A47J 45/061; A47J 37/0641; A47J 37/1209; A47J 36/32; A47J 27/004;
(Continued)

(56) References Cited

U.S. PATENT DOCUMENTS

| 1,015,176 A | * | 1/1912 | Hall | ...................... | A47J 45/071 |
| | | | | | 220/759 |
| 4,872,445 A | * | 10/1989 | Kobayashi | .............. | A47J 36/36 |
| | | | | | 126/376.1 |

(Continued)

FOREIGN PATENT DOCUMENTS

EP 2248452 A1 11/2010

OTHER PUBLICATIONS

Int'l Search Report and Written Opinion dated Feb. 14, 2017 in Int'l Application No. PCT/IB2016/056958.

*Primary Examiner* — Jun S Yoo
(74) *Attorney, Agent, or Firm* — Panitch Schwarze Belisario & Nadel LLP

(57) ABSTRACT

A mobile apparatus for cooking food includes a lid (34) and a main body (13) that defines a cooking compartment (32) in which a container (11) is adapted to be inserted. The container (11) is provided with a bottom wall (12) and at least one lateral wall (14). The container is also provided with at least two gripping elements laterally associated in an opposite position with respective perimeter portions of the container (11).

6 Claims, 3 Drawing Sheets

(51) Int. Cl.
      *A47J 43/046*       (2006.01)
      *A47J 37/12*        (2006.01)
      *A47J 37/06*        (2006.01)
      *A47J 36/32*        (2006.01)

(58) Field of Classification Search
      CPC ........ A47J 43/046; A47J 27/086; A47J 45/07;
                          A47J 45/071; A47J 45/06; A47J 45/062
      See application file for complete search history.

(56) References Cited

U.S. PATENT DOCUMENTS

| | | |
|---|---|---|
| 9,167,931 B1 * | 10/2015 | Montgomery .......... A47J 45/06 |
| 2005/0223906 A1 | 10/2005 | Xu et al. |
| 2011/0185917 A1 | 8/2011 | Goderiaux et al. |

\* cited by examiner

COOKING APPARATUS

CROSS-REFERENCE TO RELATED APPLICATIONS

This application is a Section 371 of International Application No. PCT/IB2016/056958, filed Nov. 18, 2016, which was published in the English language on May 26, 2017 under International Publication No. WO 2017/085679 A1, which claims priority under 35 U.S.C. § 119 to Italian Patent Application No. 102015000074523, filed on Nov. 19, 2015, and the disclosures of which are incorporated herein by reference.

FIELD OF THE INVENTION

The present invention concerns an automatic or semi-automatic cooking apparatus, in particular for cooking food using a heating process.

BACKGROUND OF THE INVENTION

Automatic and transportable apparatuses are known, suitable to contain and cook food, in various ways, whether the food is solid or liquid.

To be able to cook the food contained inside, containers are normally associated with the apparatuses, such as for example saucepans, pots, frying pans etc., which are heated by suitable and known heating devices able to convey the heat toward the food in an adequate manner.

In particular, cooking apparatuses are known configured to support and entirely contain a cooking container and to heat it, allowing to cook the food inside it automatically or semi-automatically.

Such cooking apparatuses generally have a main body inside which the container is introduced, and a lid, also the specialized type, which can assume at least two positions to allow or deny access to the container.

Known containers are generally provided with gripping elements configured to facilitate handling and transport, for example at least lateral handles normally integrated with a corresponding perimeter portion of the container.

It is also known that containers need the gripping elements to support the whole weight of the container and the food contained inside it, for example while the container is moved before or after cooking.

One disadvantage is that the gripping elements are not generally usable in association with known automatic and transportable cooking apparatuses, since the gripping elements, when they are fixed and protruding from the lateral bulk of the container, cannot be inserted inside the cooking apparatus while keeping the various parts correctly cooperating with each other.

Consequently, the cooking apparatus is not in a condition to operate correctly, all because the lateral protruding handles prevent a correct coupling of the container with the cooking apparatus and a correct positioning of the lid.

The handles can also create problems when washed in automatic devices.

Fixed gripping handles, generally two and opposite each other, are used simultaneously by the user to support the containers easily even when the food contained therein is very heavy.

However, fixed handles do not generally allow to perform certain operations correlated with cooking, for example shaking and/or mixing the food.

Containers are also known, provided with a single gripping element of the mobile type, for example foldable or removable from the container, individually usable to support the containers, and which is generally configured to protrude laterally more than a fixed gripping element, to be used easily with one hand only, facilitating different cooking operations.

One disadvantage connected to the presence of a single gripping element disposed on one side only of the container is that, if the weight of the container and the food contained inside it is particularly great, it may be particularly inconvenient, also for reasons of balance, to handle the container with a single gripping element.

Document US-A-2005/0223906 describes a cooking apparatus provided with a lid and a main body defining a cooking compartment to selectively insert a container. The container is provided with at least two gripping elements laterally associated in an opposite position, in which one gripping element is fixed with respect to the container, while the other gripping element is connected to the container by a hinge.

One purpose of the present invention is to obtain a cooking apparatus with which a cooking container can be associated, provided with gripping elements suitable to facilitate the handling and transport of the containers.

Another purpose of the present invention is to obtain an apparatus for cooking food with which a cooking container can be associated, provided with gripping elements and suitable to cooperate correctly, allowing the apparatus to operate automatically or semi-automatically.

Another purpose of the present invention is to obtain a cooking container associable with a cooking apparatus and provided with gripping elements suitable to facilitate the handling and transport thereof and which can also be used separately from the cooking apparatus, facilitating the typical operations of cooking processes.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a cooking apparatus to which the invention refers can be selectively associated with a container for cooking food provided with gripping elements, such as handles, for example.

The gripping elements are configured to allow to handle and transport the container or the cooking apparatus containing the container.

According to one aspect of the present invention, the container is provided with at least two gripping elements laterally associated with respective perimeter portions of the container, in an opposite position, wherein at least one of the gripping elements is fixed and at least one gripping element is mobile, that is, it can be folded and/or removed from the container.

According to one aspect of the present invention, each gripping element is attached to the container by means of a stiffening element with a first portion for attachment to a lateral wall of the container by means of connection elements and a second portion protruding toward the outside with respect to the lateral wall.

The first portion and the second portion are connected to each other and the first portion has an oblong development and is entirely in contact with the lateral wall of the container for a determinate overlapping section, thus creating an extremely solid coupling between gripping elements and container, able to also support substantial weights of food inside the container.

The combination of at least one fixed gripping element and at least one mobile gripping element, associated with respective lateral portions of the container and substantially opposite each other, advantageously allows to facilitate the handling and transport of the containers, and consequently of the apparatuses associated with the containers.

For example, if there is a substantial weight of food contained in the container it is advantageous to grip the container from both sides using both gripping elements, so as to distribute the weight and balance the positioning of the food inside the container. Moreover, as we said, thanks to the ample overlapping of the surface with the lateral wall of the container, the stiffening element creates a solid and stable connection between the gripping elements and the container even when lifting a substantial weight.

On the other hand, if particular operations are to be carried out, such as stirring, mixing, shaking etc. the food, it is advantageous to use only one of the gripping elements, advantageously of the type with an ample lateral extension protruding from the corresponding perimeter portion of the container.

The mobile gripping element, if it is the type that folds over the container, can selectively assume at least two stable positions.

In particular, the mobile gripping element can assume a first stable position in which its longitudinal development is substantially parallel to the lateral wall of the container, Moreover, the mobile gripping element can assume a second stable position in which it is cantilevered with respect to the lateral wall of the container, and in particular with respect to the lateral wall of the cooking apparatus.

The first position can advantageously be used to momentarily reduce the overall bulk of the mobile gripping element, reducing the overall bulk of the apparatus, and giving a better management of the container and of the apparatus inside the kitchen.

Moreover, according to one aspect of the present invention, this position can be suitable to improve the clamping of the container to the cooking apparatus. In particular, in this first stable position the mobile gripping element can be substantially resting on the lateral wall of the cooking apparatus, in order to further secure the container to the latter.

The mobile gripping element can be used in association with the fixed gripping element to lift substantial weights or individually to easily carry out typical operations in the cooking processes, such as removing the food from the pan, pouring etc.

According to another aspect of the present invention, one or both of the gripping elements can be selectively associated removably with the container.

This aspect advantageously allows to obtain a cooking container for food that is versatile and universal and allows different uses on the basis of the cooking requirements and/or on the basis of the weight of the food to be cooked and/or on the basis of particular needs of the user.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
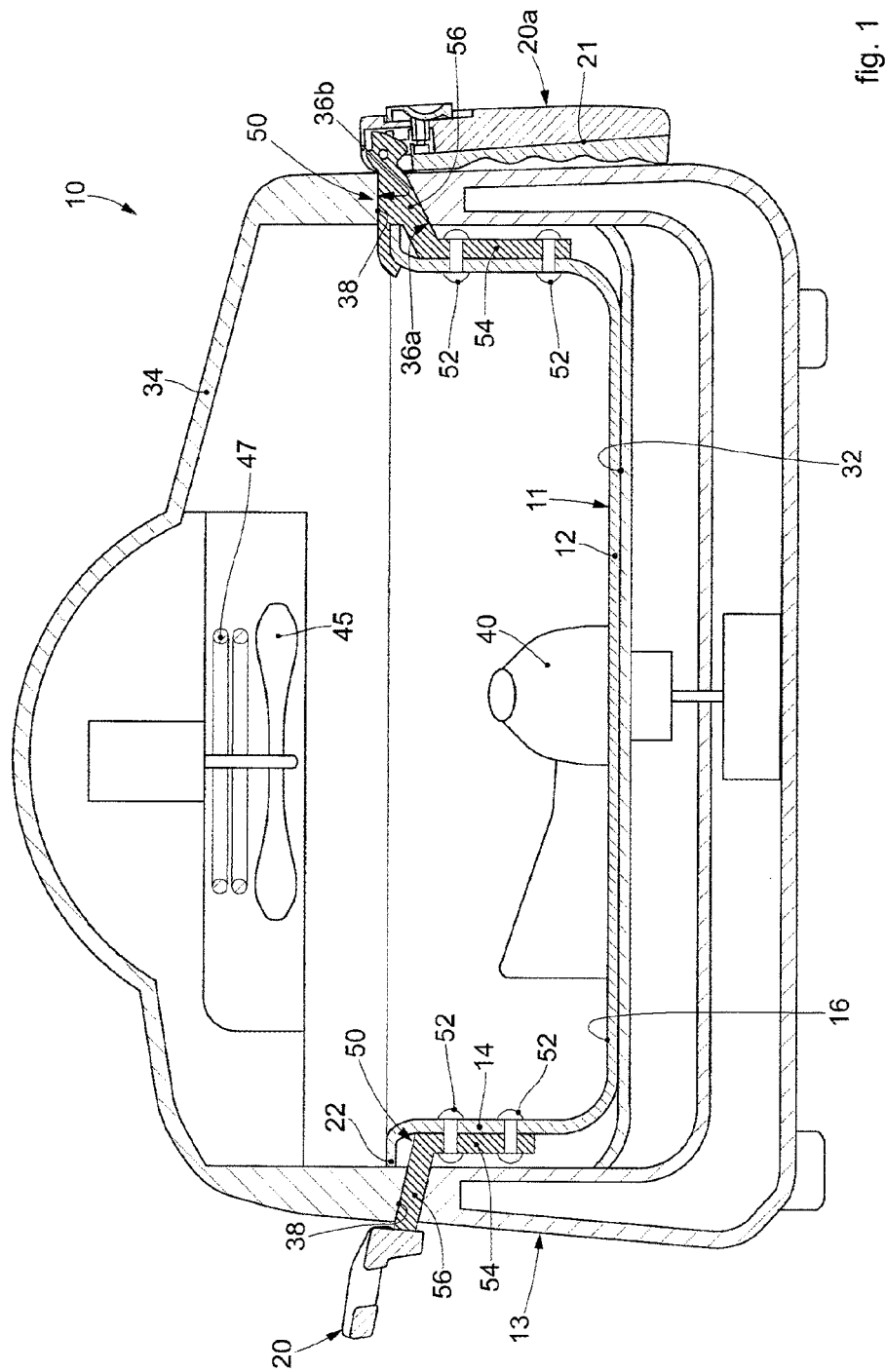
FIG. 1 is a section view of an apparatus for cooking food associated with a cooking container provided with gripping elements, according to the present invention.

According to the present description, the invention concerns a mobile automatic or semi-automatic apparatus 10 for cooking food by a heating process.

The apparatus 10 has a main body 13 and a lid 34, stably associated or associable with the main body 13, said lid 34 being able to assume at least two operating positions.

The function of the lid 34 is to create a protected cooking space with the necessary conditions for cooking the food.

The main body 13 is advantageously equipped for example with heating means and/or control and command means and/or ventilation means and/or mixing means, as well as tools and other elements typical of known apparatuses which will not be referred to further or described in detail hereafter.

In particular, the apparatus 10 can have ventilation means 45 associable with heating means 47, for example both provided on the lid 34, and mixing means, for example a beater 40.

According to the invention, the main body 13 has a cooking compartment 32 with which a container 11 is associable, able to contain food both solid and/or liquid, to be cooked.

The apparatus 10, shown by way of example and schematically in FIG. 1, can be configured to completely contain the container 11 inside it, in particular inside the cooking compartment 32, and to be able to cook the food inside it.

The container 11 is provided with, and in particular delimited by, a bottom wall 12 and at least a lateral wall 14 which define a containing compartment 16.

The bottom wall 12 can be substantially flat, conical, hump-shaped or can have discontinuities or depressions.

The food is inserted inside the containing compartment 16, and also possible condiments or other, such as oil, salt, sauces, etc.

Figure 2:
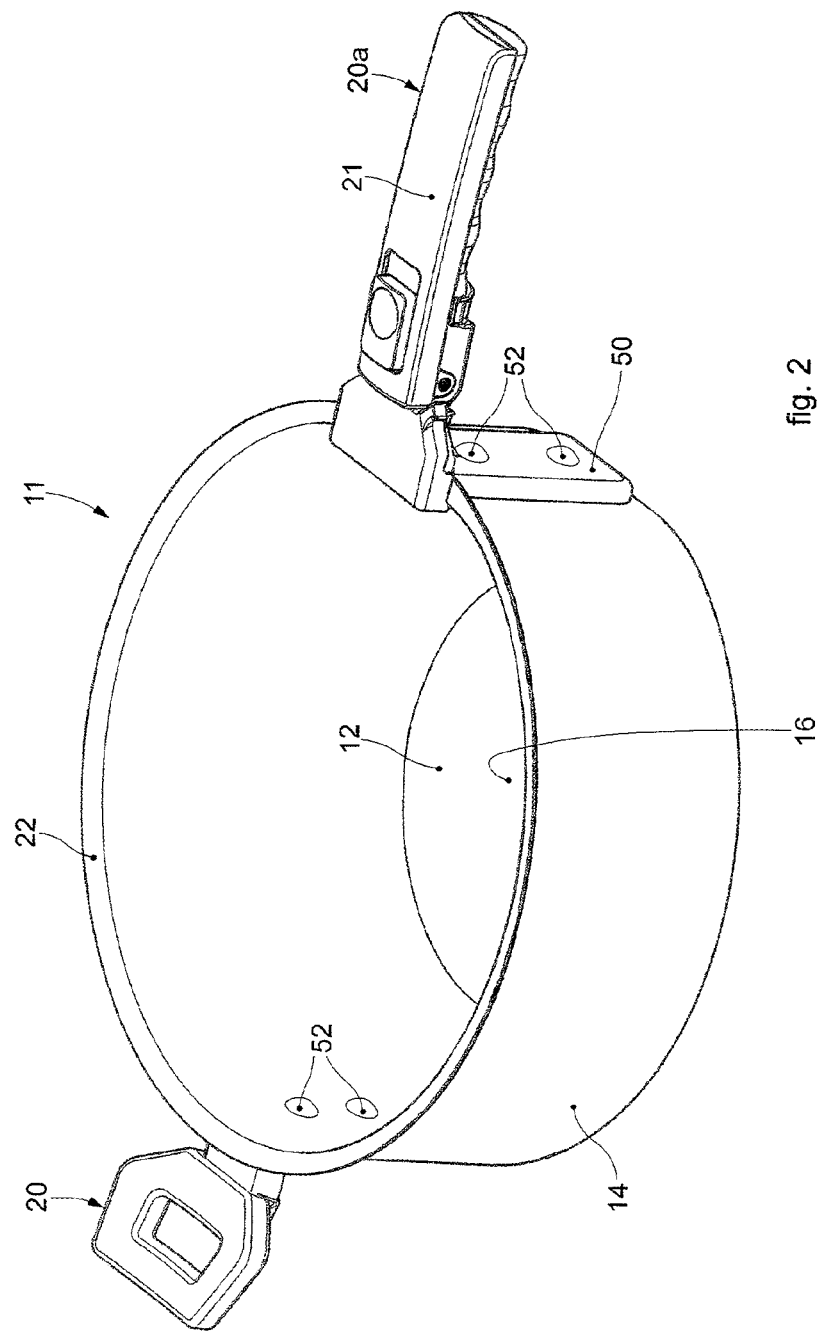
FIG. 2 is a perspective view of a container for cooking food provided with gripping elements, according to the present invention.
Figure 3:
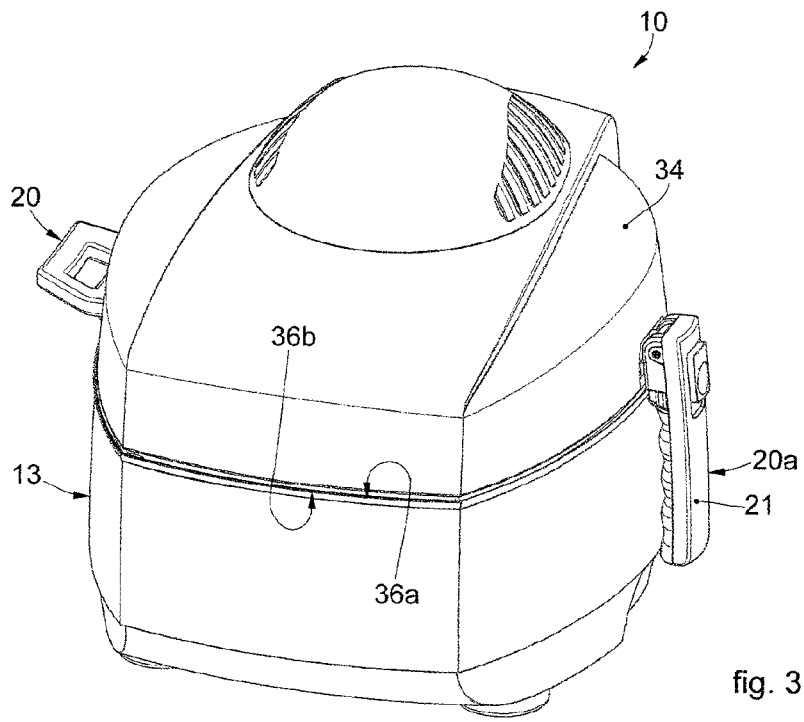
FIG. 3 is a perspective view of an apparatus for cooking food associated with a cooking container provided with gripping elements, in a first position of the mobile gripping element, according to the present invention.

With reference to FIG. 2, by way of example the container 11 has a substantially cylindrical shape.

According to a possible embodiment of the present invention, the upper part of the container 11 is provided with an edge 22. By way of example, the edge 22 extends on a plane parallel to the base, in this case substantially horizontal.

According to the present invention, the container 11 is provided with at least two gripping elements 20, such as for example handles, grips, knobs or suchlike.

According to a possible embodiment of the present invention, the gripping elements 20 are associated with the container 11 and remain substantially outside the apparatus 10. In particular, the gripping elements 20 can be fixed non-removably to the container 11, or at least one of them can be selectively removable from the container 11.

According to the present invention, as shown in FIGS. 1-4, two gripping elements 20 are provided, for example disposed one opposite the other.

According to a first possible embodiment, each gripping element 20 can be associated and in particular attached to a corresponding perimeter portion of the lateral wall 14.

According to one aspect of the present invention, each gripping element 20 is associated and in particular attached to a stiffening element 50 associated with the container 11.

The stiffening element 50, for example a bracket, is attached to the container 11 to allow an extremely solid, secure and stable coupling of the gripping element 20 with the container 11. In particular, the stiffening element 50 is attached to the lateral wall 14 of the container 11.

In this case, the stiffening element 50 is an angled bracket having a first attachment portion 54 in correspondence with the lateral wall 14 of the container 11 and a second portion 56 protruding toward the outside of the lateral wall 14 of the container 11 and connected to the grips of the gripping elements 20.

The first portion 54 and the second portion 56 are connected to each other and the first portion 54 has an oblong development and, during use, is located completely in contact with and overlapping the lateral wall 14.

The attachments as above can be obtained using suitable connection elements 52, such as rivets for example. In particular, the connection elements 52 attach the first portion 54 to the lateral wall 14 of the container 11. There are at least two connection elements 52, disposed at different heights on the lateral wall of the container 11, thus obtaining coupling for a long overlapping section of the first portion 54 of the stiffening element 50 and a corresponding portion of the lateral wall 14 of the container 11.

The long overlapping section obtains a robust, stable and secure coupling of the gripping elements 20 and container 11, which allows to lift even great weights of food contained inside the container 11, and prevents any loosening, also over time, of the gripping elements 20 and the container 11.

It is understood that these embodiments do not limit the field of protection of the present invention, since each gripping element 20 can be associated with any portion of the container 11, or with a combination of elements associated therewith, provided that a secure coupling of the gripping elements 20 with the container 11 is guaranteed.

According to a possible variant embodiment, at least one or both gripping elements 20 can be associated in a selectively removable manner with the container 11.

In particular, according to embodiments described above, the gripping elements 20 can be associated selectively and temporarily with the container 11, so as to allow it to be replaced according to the requirements of use of the container 11 and/or to replace the gripping elements 20 themselves after wear or breakage.

According to a possible embodiment of the present invention, the main body 13 and/or the lid 34 have a toroid zone 36 which can cooperate with the container 11 and/or the gripping elements 20.

The toroid zone 36 can have a horizontal surface or a surface inclined from the inside to the outside, or vice versa, of the apparatus 10, on which the container 11 and/or the gripping elements 20 of the container 11 can be positioned, once inserted inside the apparatus 10.

According to the present invention, the toroid zone 36a and/or 36b can have seatings 38 suitable to allow to insert the gripping elements 20 for the correct coupling of the container 11 with the apparatus 10.

According to possible variant embodiments, the seatings 38 can be present in the main body 13, the lid 34 or partly in one and partly in the other.

According to one aspect of the present invention, the number of seatings 38 provided can correspond to the number of gripping elements 20 with which the container 11 is provided.

According to one aspect of the present invention, one or the other toroid zone 36a and/or 36b and/or the seatings 38 can have one or more sealing packings.

According to a possible embodiment of the present invention, as shown by way of example in FIG. 1, when the container 11 is inserted inside the cooking compartment 32 of the apparatus 10 and the lid 34 is closed, the toroid zones 36a and 36b and in particular the one or more seatings 38 abut on the stiffening element 50, clamping the container 11 in the apparatus 10.

It is understood that this aspect does not limit the field of protection of the present invention, since different couplings can be achieved of the apparatus 10 and container 11, provided that they allow the food to be cooked correctly.

According to the present invention, at least one gripping element 20 can be mobile to selectively assume at least two stable positions.

In particular, the mobile gripping element 20a can have at least one mobile part.

The mobile gripping element 20a can comprise a grip 21 with an oblong development to allow a secure and stable grip in order to handle the container 11.

According to some embodiments of the present invention, the mobile gripping element 20a can assume at least a first position, or folded position, in which its longitudinal development is substantially parallel to the lateral wall 14 of the container 11. In particular, in this first position, shown by way of example in FIG. 3, the longitudinal development of the grip 21 is substantially parallel to the lateral wall 14.

According to possible embodiments of the present invention, in the first stable position the mobile gripping element 20a can be substantially resting on the lateral wall 14 of the cooking apparatus 10, to further secure the container 11 to the latter.

According to some embodiments of the present invention, the mobile gripping element 20a can assume at least a second position, or operating position, in which it is cantilevered with respect to the container 11.

Figure 4:
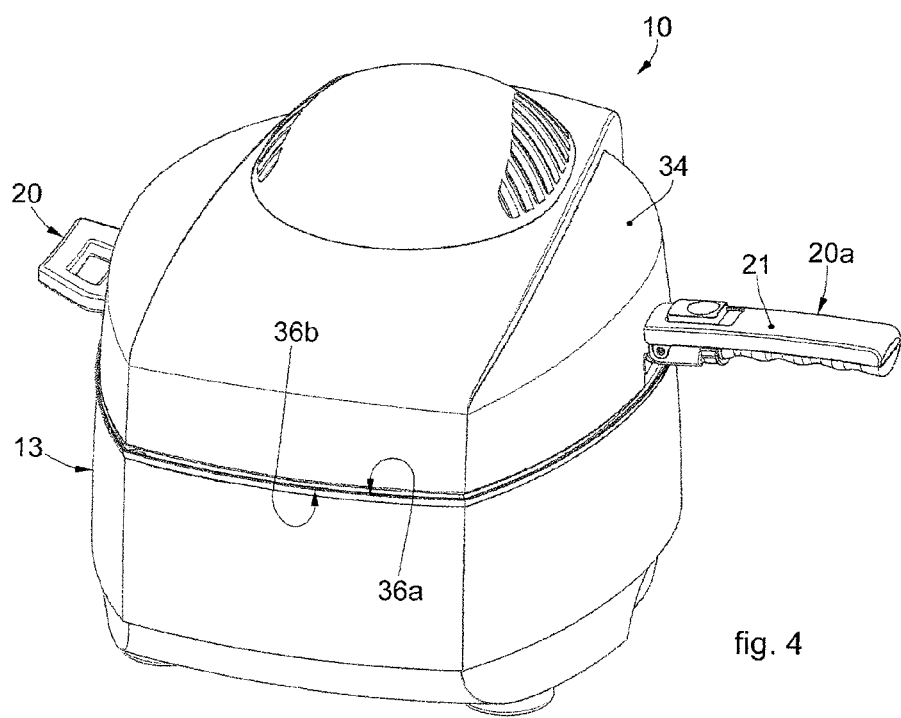
FIG. 4 is a perspective view of the apparatus for cooking food in FIG. 3 in a second position of the mobile gripping element, according to the present invention.

In the second position, shown by way of example in FIG. 4, the mobile gripping element 20a, in particular the grip 21, is cantilevered with respect to the lateral wall 14 of the container 11.

According to one aspect of the present invention, the first position can be used to momentarily reduce the bulk of the mobile gripping element 20a, and consequently the overall bulk of the container 11, and consequently of the apparatus 10.

Moreover, in the closed position, the at least one mobile gripping element 20a can be integrated inside the main body 13 of the container 11 and cooperate in clamping the container 11 in the apparatus 10.

On the contrary, the second stable position can be used during cooking and/or when it is necessary to handle the container 11 or the apparatus 10 containing the container 11.

According to one aspect of the present invention, the mobile gripping element 20a is generally more bulky than the fixed gripping element 20, as it can support a greater overall weight than the individual fixed gripping element 20.

According to another aspect of the present invention, the mobile gripping element 20a has an extension protruding from the respective lateral portion of the container 11 with respect to the fixed gripping element 20.

According to a possible variant embodiment of the present invention, the container 11 can be provided with a plurality of mobile gripping elements 20a.

It is clear that modifications and/or additions of parts may be made to the apparatus 10 as described heretofore, without departing from the field and scope of the present invention.

The invention claimed is:

1. A mobile apparatus for cooking food, the apparatus comprising a main body (13) and a lid (34), at least the main body (13) defining a cooking compartment (32) in which a container (11), provided with a bottom wall (12) and at least one lateral wall (14), is adapted to be selectively inserted, the container (11) being provided with at least two gripping elements laterally associated in an opposite position with corresponding perimeter portions of the container (11) and at least one of the gripping elements (20) being fixed with respect to the corresponding perimeter portion and at least one of the gripping elements being mobile (20a) with respect to the corresponding perimeter portion of the container (11), wherein each gripping element (20, 20a) is attached to the container (11) by a stiffening element (50) with a first portion (54) for attachment to the lateral wall (14) by connection elements (52), and a second portion (56) protruding toward the outside with respect to the lateral wall (14) and connected to the first portion (54), wherein the mobile gripping element (20a) is adapted to assume at least two stable positions with respect to the corresponding perimeter portion of the container (11), wherein the mobile gripping element (20a) has at least one folded position in which its longitudinal development is substantially parallel to the lateral wall (14) of the container (11), and wherein the mobile gripping element (20a) in the at least one folded position cooperates in clamping the container (11) inside the apparatus (10).

2. The mobile apparatus according to claim 1, wherein the first portion (54) has an oblong development and, during use, is completely in contact with the lateral wall (14) defining a section overlapping with the lateral wall (14).

3. The mobile apparatus according to claim 2, wherein there are at least two of the connection elements (52) and disposed at different heights on the lateral wall (14) of the container (11).

4. The mobile apparatus according to claim 1, wherein the mobile gripping element (20a) has at least one operating position in which it is cantilevered with respect to the lateral wall (14) of the container (11).

5. The mobile apparatus according to claim 1, wherein at least one gripping element (20, 20a) is associated with the container (11) in a selectively removable manner.

6. A mobile apparatus for cooking food, the apparatus comprising a main body (13) and a lid (34), at least the main body (13) defining a cooking compartment (32) in which a container (11), provided with a bottom wall (12) and at least one lateral wall (14), is adapted to be selectively inserted, the container (11) being provided with at least two gripping elements laterally associated in an opposite position with corresponding perimeter portions of the container (11) and at least one of the gripping elements (20) being fixed with respect to the corresponding perimeter portion and at least one of the gripping elements being mobile (20a) with respect to the corresponding perimeter portion of the container (11), wherein each gripping element (20, 20a) is attached to the container (11) by a stiffening element (50) with a first portion (54) for attachment to the lateral wall (14) by connection elements (52), and a second portion (56) protruding toward the outside with respect to the lateral wall (14) and connected to the first portion (54) wherein the mobile gripping element (20a) has an extension protruding from the corresponding perimeter portion of the container (11) with respect to the fixed gripping element (20).

* * * * *